US008775808B2

(12) United States Patent
Ali et al.

(10) Patent No.: US 8,775,808 B2
(45) Date of Patent: Jul. 8, 2014

(54) SYSTEM AND METHOD FOR PERFORMING A MANAGEMENT OPERATION

(75) Inventors: Valiuddin Y. Ali, Cypress, TX (US); Lan Wang, Cypress, TX (US); James L. Mondshine, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/259,241

(22) PCT Filed: May 26, 2009

(86) PCT No.: PCT/US2009/045142
§ 371 (c)(1),
(2), (4) Date: Sep. 23, 2011

(87) PCT Pub. No.: WO2010/138109
PCT Pub. Date: Dec. 2, 2010

(65) Prior Publication Data
US 2012/0066499 A1 Mar. 15, 2012

(51) Int. Cl.
H04L 9/32 (2006.01)
(52) U.S. Cl.
USPC .......................................... 713/170
(58) Field of Classification Search
USPC .......................................... 713/170
See application file for complete search history.

(56) References Cited

U.S. PATENT DOCUMENTS

| 2006/0200857 A1 | 9/2006 | Yokota |
| 2007/0162759 A1 | 7/2007 | Buskey et al. |
| 2007/0277038 A1 | 11/2007 | Hardy et al. |
| 2008/0005567 A1 | 1/2008 | Johnson |
| 2008/0148062 A1* | 6/2008 | Ekberg et al. ................ 713/187 |
| 2009/0276620 A1* | 11/2009 | McCarron et al. ............ 713/155 |
| 2009/0318114 A1* | 12/2009 | Bertoni ........................ 455/410 |
| 2012/0079271 A1* | 3/2012 | Cordeiro et al. ............. 713/166 |
| 2012/0173792 A1* | 7/2012 | Lassa et al. .................. 711/103 |

FOREIGN PATENT DOCUMENTS

| CN | 1752887 | 3/2006 |
| CN | 1820235 | 8/2006 |
| WO | WO 2009139779 A1 * | 11/2009 |

OTHER PUBLICATIONS

International Searching Authority, International Search Report and Written Opinion, Appln No. PCT/US2009/045142, date of mailing Feb. 18, 2010, 12 p.

* cited by examiner

Primary Examiner — Teshome Hailu
Assistant Examiner — Abiy Getachew

(57) ABSTRACT

There is provided a system and method of performing a management operation. An exemplary method comprises receiving a command that comprises information derived from a private key in response to a request to generate the command for an electronic device. The exemplary method also comprises verifying a source of the command using the information derived from the private key and a corresponding public key stored in an immutable memory of the electronic device. The exemplary method additionally comprises performing a management operation corresponding to the command if the verifying of the source of the command determines that the command is from an authorized source.

20 Claims, 3 Drawing Sheets

SYSTEM AND METHOD FOR PERFORMING A MANAGEMENT OPERATION

BACKGROUND

Many security features have been introduced for use in electronic devices such as computer systems. Such security features include pre-boot authentication, theft deterrence technology and drive encryption to name just a few examples. The usage of security tokens such as fingerprint sensors, trusted platform modules (TPM) and smart cards is also gaining popularity. These features greatly enhance the security of electronic devices.

However, this increased security sometimes presents problems for authorized service personnel as well as the platform owner. In particular, authorized service personnel may be called upon to perform system management operations that security features have been designed to guard against. For example, an authorized service person may need to flash a system memory device that contains the system basic input-output system (BIOS) to replace corrupted program information. Other legitimate system management operations that may need to be performed include revising the BIOS to an earlier version, resetting the system to a factory state or disabling chipset-based management engines in order to update chipset firmware.

Disabling security features may be difficult because attempts to disable security features in order to make an authorized repair or upgrade may appear to the system to be an attack from a hacker or other unauthorized source. The inability of an authorized user to effectively disable security features that protect the system from unauthorized access may render an otherwise valuable computer system permanently inoperative.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
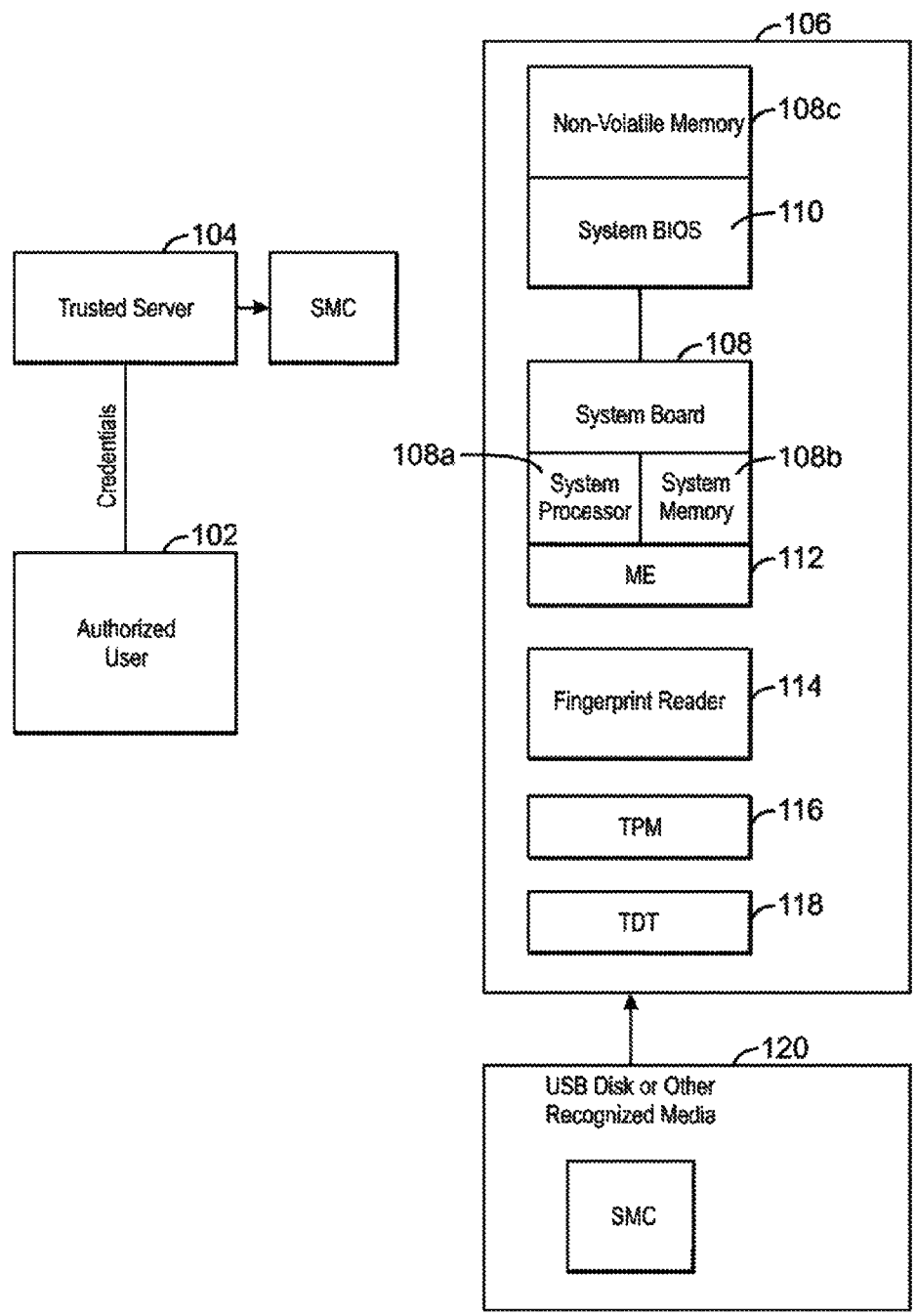
FIG. 1 is a block diagram of an infrastructure of computer systems that includes a computer that is adapted to receive a system management command in according to an exemplary embodiment of the present invention.

An exemplary embodiment of the present invention provides for cryptographic detection and verification of an authorized user and/or user environment. In particular, an authorized command such as a system management command (SMC) may be executed via a system management service (SMS) to manage or change a critical state of a platform. Such an exemplary embodiment may allow differentiation and remote delivery of commands to a platform without problems that may compromise command integrity or authenticity.

As set forth in detail below, an exemplary embodiment of the present invention allows software executing on a platform such as the BIOS to recognize the source of a system management command. System management commands may be delivered either locally or remotely. If the system management command is authenticated as originating from an authorized user/source, the command is performed by the system. Commands not authenticated as originating from an authorized user/source are not performed by the system.

The use of an encrypted system management command allows, for example, an authorized service professional to securely perform a wide range of management operations. Examples of such management operations include flashing the boot block region of the system BIOS or flashing the non-boot block region of system BIOS. Additional examples of management operations that may be performed using a system management command include allowing system administrator privileges without specific authorization, allowing setup access as a user without specific authorization, resetting the system BIOS to a factory default state or resetting the system BIOS to a factory default state while saving identity information such as a universally unique identifier (UUID) or globally unique identifier (GUID) associated with the system.

A system management command may be used to disable a security feature such as a management engine feature to allow an update of the management engine firmware without compromising the state of an associated security device such as a theft deterrence technology (TDT) device. In addition, an authorized user may be allowed to boot the system without any authenticated credentials (such as a password, smart card, fingerprint scan or the like) when the credential has been lost or forgotten. Further examples include resetting one or more system components to a factory default state, removing all BIOS users, removing all OS users, removing all BIOS security policies, removing all users or identifying a hardware profile to use.

Additional examples of management operations that may be performed using a system management command according to an exemplary embodiment of the present invention include resetting a system component that has been disabled for security reasons. In particular, a system management command may be used to reset a TPM, reset a TDT device, reset a fingerprint reader, reset a system board or the like. Moreover, an exemplary embodiment of the present invention provides these benefits to authorized users while maintaining security with respect to rouge entities.

Furthermore, a system management command according to an exemplary embodiment of the present invention may define a hierarchy of a command authority that allows end customers and independent software vendor (ISV) partners to also manage some aspects of a computer network under the same security umbrella but without direct potential involvement of the system manufacturer. End user customers may consider this feature desirable. The examples set forth below with respect to FIG. 1 provide additional detail about how a system management command may be employed to allow an authorized user to perform a management operation.

FIG. 1 is a block diagram of a network infrastructure 100 that may be used to provide a system management command at the request of an authorized user. Those of ordinary skill in the art will appreciate that the functional blocks and devices shown in FIG. 1 may comprise hardware elements including circuitry, software elements including computer code stored on a tangible, machine-readable medium or a combination of both hardware and software elements. Additionally, the functional blocks and devices of the infrastructure 100 are but one example of functional blocks and devices that may be implemented in an exemplary embodiment of the present invention.

Those of ordinary skill in the art would readily be able to define specific functional blocks based on design considerations for a particular electronic device.

The infrastructure 100 comprises an authorized user's computer 102, which may or may not be directly connected to a trusted server 104. In accordance with an exemplary embodiment of the present invention, an authorized user uses the authorized user's computer 102 or directly logs onto the trusted server 104 and is properly authenticated based on pre-defined criteria. Alternatively, authorized users may be required to prove their identity by providing security credentials such as a user-identification and a password to the trusted server 104. Access to the trusted server 104 may be restricted so that only authorized service technicians or platform owners are able to make requests to issue system management commands. After the authentication, the authorized user requests the trusted server 104 to issue a system management command to perform a management operation on the user computer system 106. In accordance with an exemplary embodiment of the present invention, the system management command may include data derived from a private key stored on the trusted server 104. By way of example, the data derived from the private key may take the form of a digital signature. As set forth below, the signature signed by the private key may be used by the user computer system 106 to authenticate the source of the system management command as an authorized source.

In one exemplary embodiment of the present invention, the user computer system 106 comprises a system board 108. The system board 108 houses major components of the user computer system 106 such as a system processor or CPU 108a, a system memory 108b and the like. The system board 108 may also store a BIOS 110 in a memory device such as a non-volatile memory 108c. The BIOS 110 is adapted to control a start-up or boot process and to control the low-level operation of the user computer system 106. Moreover, the system memory 108b and the non-volatile memory 108c that stores the BIOS 110 comprise examples of tangible, machine-readable media that store computer-readable instructions. When read and executed by a processor, the computer-readable instructions may cause the user computer system 106 to perform a management operation in accordance with an exemplary embodiment of the present invention.

The user computer system 106 may include one or more security components that are designed to prevent data theft or other unauthorized access to system resources. For example, the system board 108 comprises a management engine 112. In addition, the user computer system 106 includes a biometric access device such as a fingerprint reader 114 and/or a TPM 116. The user computer system 106 also includes a TDT device 118. In one exemplary embodiment of the present invention, the management engine 112 controls the operation of the TPM 116 and/or the TDT device 118.

In an exemplary embodiment of the present invention, a cryptographic asymmetric public key is stored inside an immutable section of the firmware of the BIOS 110. By way of example, the immutable section of the firmware of the BIOS 110 may comprise an immutable code stored in a boot block region. The immutable section of the BIOS 110 that stores the public key is not overwritten during normal flashing operations, even if such flash operations are directed to the boot block region by a system management command. As set forth below, additional encryption keys may be stored in regions of memory/flash that are mutable. Such encryption keys, however, may not be used to authenticate a source of a system management command needed to perform certain highly secure management operations on the user computer system 106. Additional encryption keys can be securely added and stored in the immutable section of the BIOS 110 and have the same capability to perform highly secure management commands on user computer system 106.

For example, the user computer system 106 may have multiple security levels. A first security level may include pre-boot security. Pre-boot security may operate to disable the BIOS 110 if a security credential such as a Universal Serial Bus (USB) token or the like is not present. A second security level may comprise hard drive encryption. In a system with hard drive encryption, access to encrypted data stored on a hard drive of the user computer system 106 may be denied if a security credential is not present or provided by the user. A third security level is operating system access. Access to the operating system of the user computer system 106 may be denied if another security credential such as a password is not provided.

According to an exemplary embodiment of the present invention, a system management command may comprise a security level. An encryption key stored in the immutable section of the BIOS 100 may be needed to authorize the performance of system management commands directed to one or more of the highest security levels.

When the trusted server 104 receives a request for a system management command from an authorized user, an application running on the trusted server 104 prepares the system management command and includes with it information derived from the private key. The information derived from the private key may be included as an attribute of the system management command. Alternatively, the system management command provided by the trusted server 104 may be digitally signed with the private key. The system management command may contain data that optionally makes the system management command operational only for a particular platform or a series of platforms. Moreover, the system management command may be operational based on command scope, based on start and end date restrictions, based on a maximum number of executions or the like. Specific formats for system management commands that accomplish particular functions or restrictions may be determined by those of ordinary skill in the art based on system design considerations.

By way of example, a system management command may be designed to disable the ME 112 only on a particular system for only one execution. The system management command may be further restricted by a start date and/or an end date. The system management command may be further restricted to being provided by a particular user, such as the authorized user who requested the command. The system management command may additionally include logging and auditing data such as the identity of the requesting authorized user, when the system management command was requested, from where it was requested or the like.

After the system management command is created by the trusted server 104, the system management command is delivered to a system management command provisioning device (SMCPD) 120. Examples of devices that may perform the function of the SMCPD 120 include smart cards, USB keys, USB crypto tokens or the like. Moreover, the purpose of the SMCPD 120 is to deliver the system management command to the user computer system 106. Note that in some systems, the system management command may be delivered by first being routed through a trusted path or through a trusted entity instead of being directly deposited to an SMCPD. In yet other cases, the SMCPD may itself be created in the backend itself and then delivered to a trusted entity. The trusted entity may be an IT administrator, a supervisor, a manager, or other such entity(ies) that can further validate the identity and authorization of a service personnel before granting access to the SMCPD. This trusted entity can also be used to provide a system generated usage secret that is needed to authorize the use of the system management command itself. In this case, the system either allows or auto generates a secret whose digital hash is stored in the system management command itself and the secret is then delivered to the trusted entity who can deliver it to the authorized service personnel or the system can display the secret to the service professional at the time of provisioning of the system management command to the SMC.

Once the system management command is provisioned, it is delivered to the user computer system 106, either locally or remotely. In an exemplary embodiment of the present invention, the BIOS 110 of the user computer system 106 is adapted to be in a mode to detect incoming system management commands in an early stage of a booting operation.

In one exemplary embodiment of the present invention, the SMCPD 120 is directly connected to the user computer system 106. Alternatively, the SMCPD 120 may be adapted to remotely deliver the system management command to the user computer system 106, for example, via a network connection. In such a case, the system management command may be delivered to a particular location in the user computer system 106, where it may be read by the BIOS 110. The remote delivery of the system management command is made possible by depositing or delivering the command to a pre-designated system management command delivery "mail slot"—much like a post office box. The BIOS 110 then can be programmed to check the mail slot at every boot automatically or via a user or administrative supplied action such as pressing of a special key sequence during the system boot. In this case, the mail slot then acts as the "virtual" form of the SMCPD for storing the system management command.

When the BIOS 110 receives the system management command from the SMCPD 120, it authenticates the system management command using the public key stored in the immutable section of the BIOS 110. If it verifies that the system management command is indeed signed by the corresponding private key and the integrity of the system management command is intact, the particular action indicated by the system management command is performed. If the verification fails, the particular management operation indicated by the system management command is not performed. In this manner, chances of receiving a command from an unauthorized source that can be erroneously authenticated are reduced. The likelihood of unauthorized access may be further reduced by such functions as restricting the date range during which the system management command is valid or including a maximum number of times to execute the system management command as part of the system management command.

In one exemplary embodiment of the present invention, the BIOS 110 may store a list of system management commands that are allowed for the user computer system 106. In addition, the BIOS 110 may store a list of system management commands that have been executed or attempted to be executed. In this manner, the BIOS can determine whether the number of execution attempts for a given system management command has been exceeded. If the number of execution attempts for a particular command has been exceeded, execution of the command will not be permitted. In an alternative embodiment, the SMCPD 120 may be adapted to receive the number of system management commands of a given type that have been executed and to restrict extraction of a system management command if a maximum number of command executions has been exceeded. To further facilitate the identification of a particular instance of a system management command, a unique command identifier such as that based on a UUID or GUID is pre-computed, assigned, and embedded in every command that is provisioned. This unique identifier acts as a serial number of sort to help identify a command from a list of previously stored commands or to match against a new incoming command request.

As set forth above, the BIOS 110 may store multiple asymmetric encryption keys, each of which may be used for a different purpose. Additional encryption keys are not necessarily stored in an immutable region of memory of the user computer system 106. In addition, a system management command may be used to update existing encryption keys stored in the immutable region of the BIOS 110. This feature allows the authorized user to use a private key/public key pair that is not known outside of the authorized user's organization. In particular, the authorized user may select a private key/public key pair that is not known by the manufacturer of the user computer system 106, if desired. There are SMC commands to set/change the usage of the SMC keys in the system. For example, there can be a SMC command to disable a certain SMC key.

In an exemplary embodiment of the present invention, an SMC may be used to disable one or more SMC keys either temporarily or permanently. SMC keys that have been temporarily disabled may be enabled by an SMC using an enable parameter. This functionality allows a customer of a system manufacturer to disable all SMCs, including SMCs provided by the manufacturer. Alternatively, the customer may choose to disable only SMCs provided by the manufacturer. In an exemplary embodiment of the present invention, the SMCs provided by the owner of the computer systems have a higher security level than the SMCs provided by the manufacturer. A third level of security may be provided for SMCs from entities working under the direction of the customer, such as an ISV partner of the customer. In one exemplary embodiment of the present invention, SMC keys associated with each security level may be disabled either temporarily or permanently by an SMC of the same security level.

Multiple encryption keys may be used to define a hierarchy of command authorization in which a customer, an ISV or a value-added reseller (VAR) can be authorized to manage appropriate levels of system management commands. The specific system management commands that are appropriate for a given entity to be allowed to execute on the user computer system 106 may be determined based on individual system requirements. In one exemplary embodiment of the present invention, certain functions may only be performed by system management commands that are authenticated as originating with the original equipment manufacturer (OEM) of the user computer system 106.

Additional restrictions for the use of multiple encryption keys may be imposed according to an exemplary embodiment of the present invention. By way of example, one or more "don't care" attributes may be associated with a system management command. An example of a "don't care" attribute may include the system serial number. The "don't care" attributes may be ignored or treated as not needed when performing certain system management commands that originate from various sources having their own encryption key stored in the BIOS 110.

A scheme could be devised in which, under policy control, any source of a system management command other than the OEM must include a serial number for the user computer system 106. Under such a scheme, a system management command authenticated as originating from the OEM may be applied to any user computer system produced by that OEM regardless of the contents of the serial number attribute associated with the system management command. In such a case, the system serial number attribute would be considered a "don't care" attribute for system management commands authenticated as originating from the OEM.

An exemplary embodiment of the present invention may improve the cost-effectiveness of network infrastructure management. Indeed, such an exemplary embodiment may provide increased system security by increasing the difficulty of unauthorized access to user systems within a network.

Figure 2:
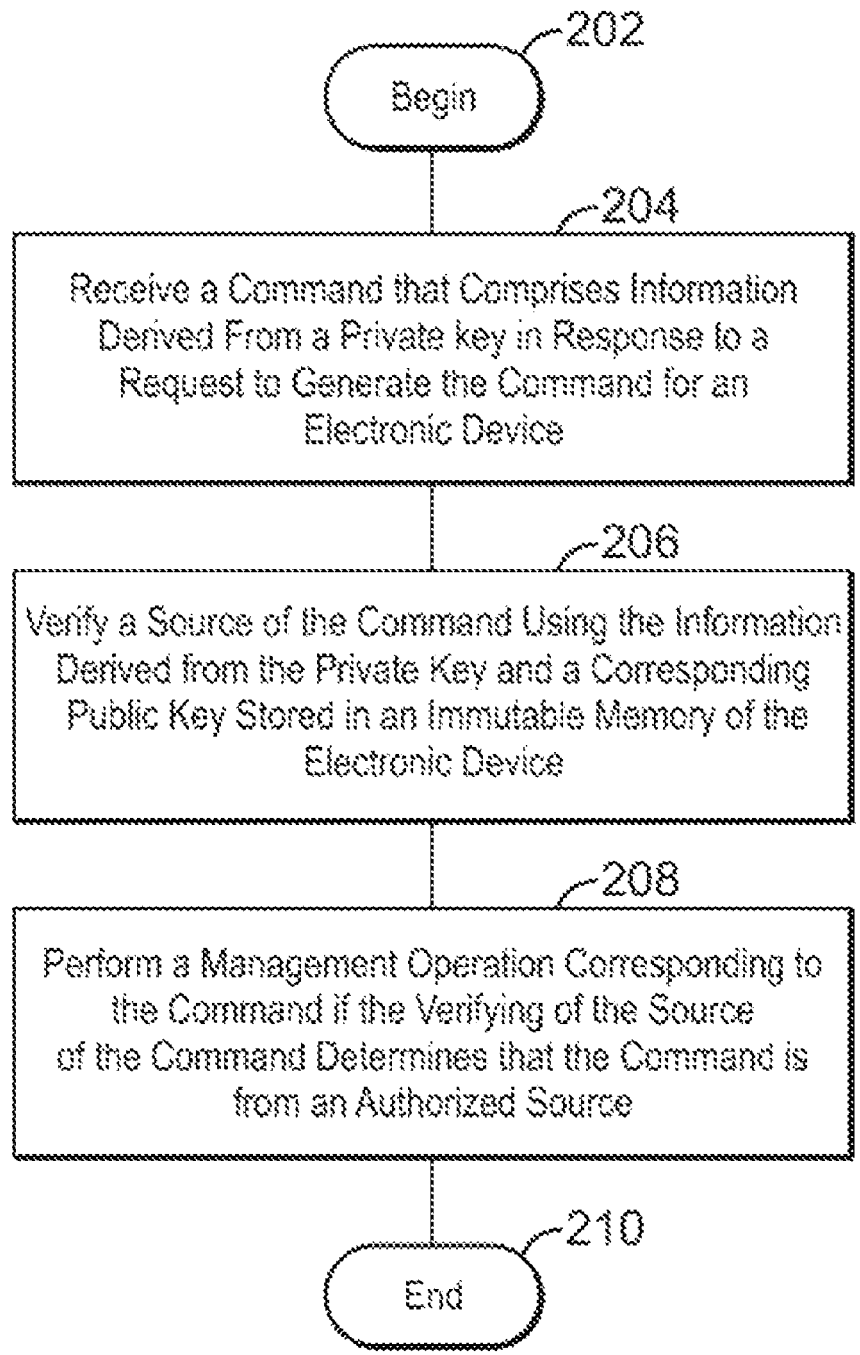
FIG. 2 is a process flow diagram showing a method of performing a management operation according to an exemplary embodiment of the present invention.

FIG. 2 is a process flow diagram showing a method of performing a management operation according to an exemplary embodiment of the present invention. The method is generally referred to by the reference number 200.

The method begins at block 202. At block 204, a command that includes information derived from a private key is received in response to a request to generate the command for an electronic device. In an exemplary embodiment of the present invention, the information derived from the private key comprises a digital signature. A source of the command is verified by a corresponding public key stored in an immutable memory of the electronic device, as shown at block 206. At block 208 a management operation corresponding to the command is performed if the verifying of the source of the command determines that the command is from an authorized source. The process ends at block 210.

Figure 3:
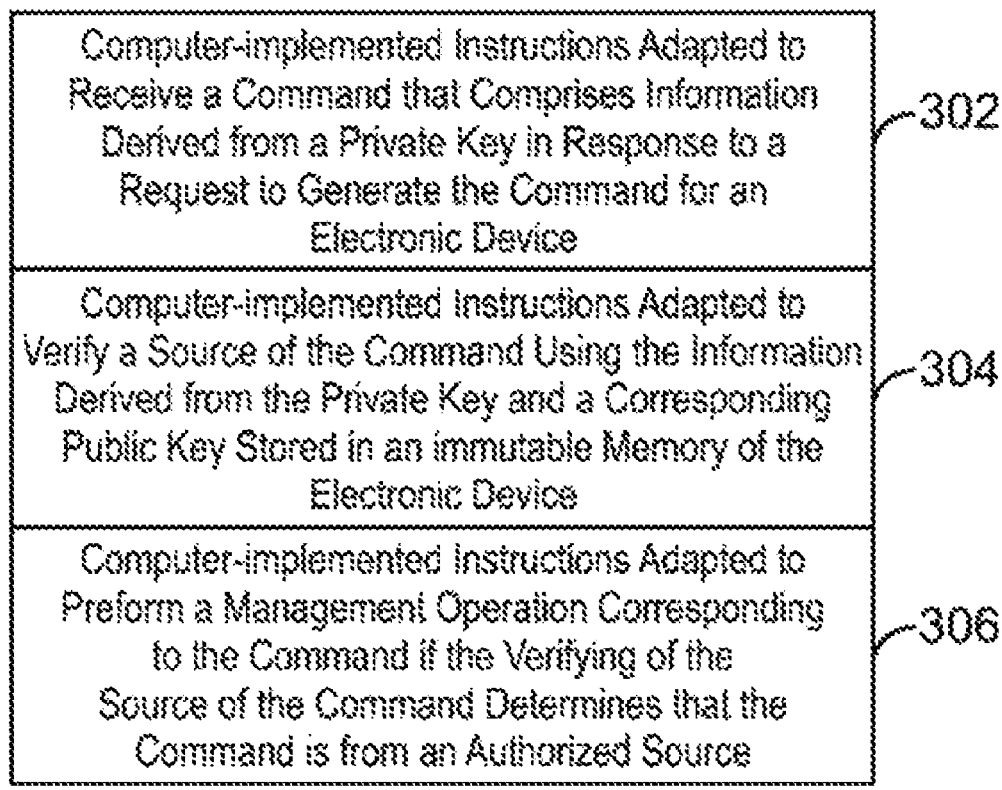
FIG. 3. Is a block diagram showing a tangible, machine-readable medium that stores computer-readable code adapted to perform a management operation according to an exemplary embodiment of the present invention.

FIG. 3. Is a block diagram showing a tangible, machine-readable medium that stores computer-readable code adapted to perform a management operation according to an exemplary embodiment of the present invention. The tangible, machine-readable medium is generally referred to by the reference number 300. The tangible, machine-readable medium 300 may correspond to any typical storage device that stores computer-implemented instructions, such as programming code or the like. Moreover, the tangible, machine-readable medium 300 may comprise the system memory 108b and/or the non-volatile memory 108c shown in FIG. 1. When read and executed by a processor such as the processor 108a shown in FIG. 1, the instructions stored on the tangible, machine-readable medium 300 are adapted to cause the processor to perform a management operation in accordance with an exemplary embodiment of the present invention.

A first region 302 of the tangible, machine-readable medium 300 stores computer-implemented instructions adapted to receive a command that comprises information derived from a private key in response to a request to generate the command for an electronic device. A second region 304 of the tangible, machine-readable medium 300 stores computer-implemented instructions adapted to verify a source of the command using the information derived from the private key and a corresponding public key stored in an immutable memory of the electronic device. A third region 306 of the tangible, machine-readable medium 300 stores computer-implemented instructions adapted to perform a management operation corresponding to the command if the verifying of the source of the command determines that the command is from an authorized source.

Those of ordinary skill in the art will appreciate that exemplary embodiments of the present invention reduce information technology maintenance costs by providing a way to perform management operations in a network infrastructure. Moreover, exemplary embodiments of the present invention provide a secure way to perform system updating and maintenance.

What is claimed is:

1. A method of performing a management operation, the method comprising:

receiving via a processor of a first electronic device a command that comprises information derived from a private key in response to a request from a second electronic device to generate the command for the first electronic device;

verifying via the processor a source of the command using the information derived from the private key and a corresponding public key stored in an immutable memory of the first electronic device; and performing via the processor a management operation corresponding to the command if the verifying of the source of the command determines that the command is from an authorized source.

2. The method recited in claim 1, the command being of a first security level, the method comprising:

receiving via the processor a second command that comprises information derived from a second private key, the second command being of a second security level different than the first security level, in response to a request to generate the second command for the electronic device;

verifying via the processor a source of the second command using the information derived from the second private key and a corresponding second public key stored in a mutable memory of the first electronic device;

verifying via the processor whether the second source is authorized to perform a management operation of the second security level; and performing via the processor a second management operation corresponding to the second command if the verifying the source of the second command determines that the second command is from an authorized source and if the verifying whether the second source is authorized to perform the management operation of the second security level.

3. The method recited in claim 2, wherein the second security level is higher than the first security level.

4. The method recited in claim 2, wherein the management operation comprises provisioning a third private key to be stored in the mutable memory of the first electronic device or changing the third private key.

5. The method recited in claim 1, wherein the management operation comprises at least one of disabling a security feature, resetting the security feature, flashing a boot block region of a basic input/output system (BIOS) of the first electronic device, flashing a non-boot block region of the BIOS, allowing system administrator privileges, allowing setup access, resetting a system component of the first electronic device to a default state, removing a user, removing a security policy, temporarily disabling commands comprising information derived from the private key, enabling commands comprising information derived from the private key, permanently disabling commands comprising information derived from the private key, or identifying a hardware profile for use by the first electronic device.

6. The method recited in claim 5, wherein the security feature comprises at least one of a management engine feature, a trusted platform module (TPM), a theft deterrence technology (TDT) device, a fingerprint reader, or a system board.

7. The method recited in claim 1, wherein the command is provided from a trusted server.

8. The method recited in claim 7, wherein the second electronic device comprises the trusted server.

9. The method recited in claim 7, wherein the second electronic device comprises an authorized-user computer in communication with the trusted server.

10. The method recited in claim 1, wherein the command is restricted to being performed a specific number of times, to being performed after a specific start date, to being performed before a specific end date, or to being performed only if requested by a specific user.

11. The method recited in claim 1, wherein the command comprises logging data and/or auditing data that comprises an identity of an authorized user who requested the command, when the system management command was requested and/or from where the command was requested.

12. The method recited in claim 1, wherein the command comprises a system management command.

13. The method recited in claim 1, wherein the command is provisioned to a system management command provisioning device (SMCPD).

14. The method recited in claim 13, wherein receiving the command comprises receiving the command locally to the first electronic device by connecting the SMCPD to the first electronic device.

15. The method recited in claim 1, wherein the command comprises a "don't care" attribute that applies only to commands that comprise a highest security level of the first electronic device.

16. The method recited in claim 1, wherein the source comprises a trusted server.

17. A first electronic device adapted to perform a management operation, the first electronic device comprising:
   a processor adapted to execute stored machine-readable instructions; and
   a memory device that stores machine-readable instructions executable by the processor, the machine-readable instructions comprising instructions adapted to cause the processor to receive a command that comprises information derived from a private key in response to a request from a second electronic device to generate the command for the first electronic device, instructions adapted to verify a source of the command using the information derived from the private key and a corresponding public key stored in an immutable memory of the first electronic device, and instructions adapted to perform a management operation corresponding to the command if the verifying of the source of the command determines that the command is from an authorized source.

18. The first electronic device recited in claim 17, wherein the second electronic device comprises a trusted server that provisions the command.

19. The first electronic device recited in claim 17, wherein the second electronic device comprises an authorized-user computer in communication with a trusted server that provisions the command, and the first electronic device is configured for a user computer system.

20. A tangible, machine-readable non-transitory medium that stores machine-readable instructions executable by a processor of a first electronic device to perform a management operation, the tangible-machine-readable non-transitory medium comprising:
   machine-readable instructions that, when executed by the processor, receive a command that comprises information derived from a private key in response to a request from a second electronic device to generate the command for the first electronic device;
   machine-readable instructions that, when executed by the processor, verify a source of the command using the information derived from the private key and a corresponding public key stored in an immutable memory of the first electronic device: and
   machine-readable instructions that, when executed by the processor, perform a management operation corresponding to the command if the verifying of the source of the command determines that the command is from an authorized source.

* * * * *

UNITED STATES PATENT AND TRADEMARK OFFICE
CERTIFICATE OF CORRECTION

| | | |
|---|---|---|
| PATENT NO. | : 8,775,808 B2 | Page 1 of 1 |
| APPLICATION NO. | : 13/259241 | |
| DATED | : July 8, 2014 | |
| INVENTOR(S) | : Valiuddin Y. Ali et al. | |

It is certified that error appears in the above-identified patent and that said Letters Patent is hereby corrected as shown below:

In the Claims

In column 10, line 31, in Claim 20, delete "device:" and insert -- device; --, therefor.

Signed and Sealed this
Fourteenth Day of October, 2014

Michelle K. Lee
*Deputy Director of the United States Patent and Trademark Office*